Jan. 24, 1950     J. SCHULTES ET AL     2,495,645
LEVEL-SQUARE COMBINATION
Original Filed June 8, 1946
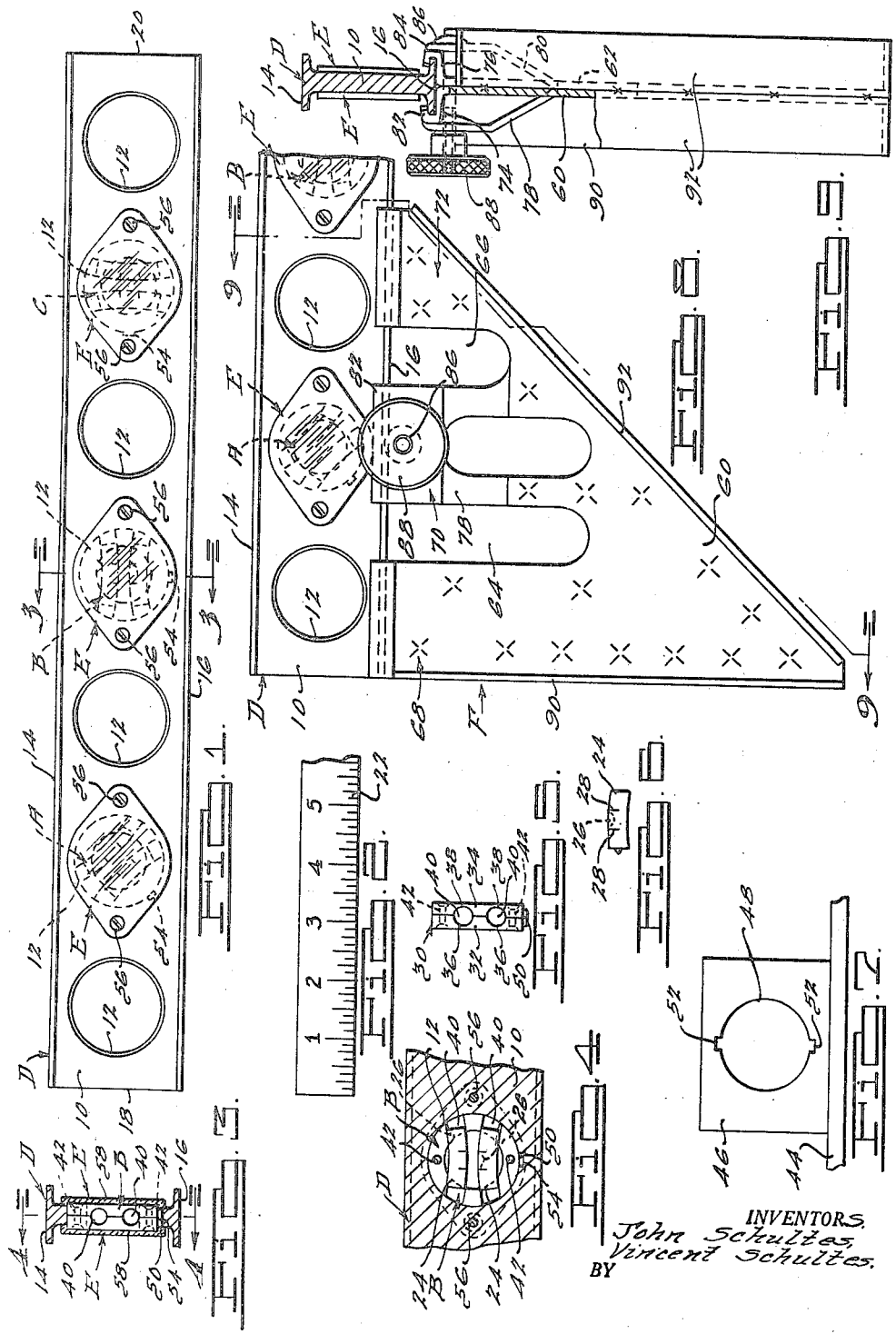
INVENTORS.
John Schultes,
Vincent Schultes.
BY
ATTORNEYS.

Patented Jan. 24, 1950

2,495,645

UNITED STATES PATENT OFFICE 2,495,645

LEVEL-SQUARE COMBINATION

John Schultes and Vincent Schultes, Detroit, Mich.

Original application June 8, 1946, Serial No. 675,396. Divided and this application November 6, 1947, Serial No. 784,320

4 Claims. (Cl. 33—89)

This invention relates to new and useful improvements in a novel combination of spirit level and square.

This is a division application of our copending application, Serial No. 675,396, which was filed on June 8, 1946.

An important object of the present invention is to provide a spirit level having a work-engaging or testing edge and a plurality of indicator units positioned to register accurately when the work-engaging edge is disposed at different predetermined angles from the horizontal.

A yet further object of the invention is to provide a spirit level and square combination which includes novel means for holding the level and square together and wherein the level is readily adjustable on the square.

Other objects and advantages of the invention will be apparent during the course of the following description.

In the drawing forming a part of this specification and wherein like numerals are employed to designate like parts throughout the same, Fig. 1 is a side elevational view of a spirit level.

Fig. 2 is a fragmentary edge evelational view thereof,

Fig. 3 is a transverse sectional view taken on the line 3—3 of Fig. 1,

Fig. 4 is a fragmentary, longitudinal sectional view taken on the line 4—4 of Fig. 3, Fig. 5 is an edgewise elevational view of the vial retainer which comprises a part of the indicator unit, Fig. 6 is a side elevational view of a vial which together with the retainer shown in Fig. 5 forms an indicator unit of the spirit level, Fig. 7 is a side elevational view of a suitable jig for accurately assembling the vial and vial retainer, Fig. 8 is a side elevational view of a square embodying the invention and showing the same associated with a fragmentary portion of the spirit level, and Fig. 9 is a vertical sectional view taken on the line 9—9 of Fig. 8.

In the drawing, wherein for purpose of illustration is shown a preferred embodiment of the invention, attention is first directed to Figs. 1–7 which show the novel features and construction of the spirit level, per se. According to the present invention three indicator units A, B and C are mounted in longitudinally spaced relation in suitable sockets provided in a body D and each unit is adapted to register a different angular position of the body with respect to the horizontal. These units are retained in their respective sockets and in fixed association with the body D by suitable transparent covers E. It is to be understood, however, that although three level indicator units are here shown by way of illustration, the number of units employed is not critical. Any desired number of units can be used.

The support D preferably is made of plastic or extruded aluminum bar stock and is generally I-shaped in transverse section, as shown in Fig. 3. In practice, carpenters, machinists and other craftsmen require levels of varying size and length and it is contemplated that the body D be formed merely by cutting a piece of a desired length from stock material of suitable size. It will be observed that the central web portion 10 is provided at spaced intervals along its length with holes 12. Alternate holes 12 define sockets for the level indicator units A, B and C and the others merely serve to lighten the body D. The upper and lower edges 14 and 16, which are flat, exactly parallel and precisely at right angles to the ends 18 and 20, provide accurate work-engaging or testing surfaces. Also, the upper and lower edges 14 and 16 preferably are provided with suitable scales 22, as shown in Fig. 2, for convenience of the user and in order to permit the level to function as a rule.

The indicator units A, B and C are identical in construction but, as suggested, they are mounted at different predetermined angles in the body D. For example, in the arrangement here shown by way of illustration, the unit A is mounted to indicate when the work-testing surfaces 14 and 16 are disposed at an angle of 45°, the unit B is mounted to indicate when the work-testing surfaces are disposed horizontally and the unit C is mounted to indicate when the work-testing surfaces are disposed upright or perpendicular.

Each of the level indicator units includes a pair of glass vials 24 which are filled with the usual liquid in such manner as to form a bubble 26 therein. The vials are generally cylindrical in transverse section and arcuately curved longitudinally, as shown in Fig. 6. On the top surface of each vial 24 is a pair of longitudinally spaced transverse marks 28 which indicate when the bubble 26 is centered therein.

The two vials 24 are mounted in a retainer 30 which comprises two ring-shaped members 32 and 34 disposed side-by-side and having registering grooves 36 and 38 in their mating surfaces. These grooves 36 and 38 collectively define a pair of tubular passages 40 which snugly receive respective vials 24. As best shown in Fig. 4, the passages 40 extend through the plane of the retainer 30 and are curved longitudinally in opposite directions and on the same radius as the vials 24. It will be observed that the passages 40 are longer than the vials 24 so that the latter can be shifted or adjusted back and forth therein. Also, the passages 40 extend through the open centers of members 32 and 34 and position the vials 24 so that bubbles 26 are easily visible through such open center portions. Members 32 and 34 can be made of any suitable material but preferably and conveniently are made of a suitable opaque and colored transparent plastic and are fastened together in any suitable manner, as by rivets 42. By reason of the fact that passages 40 open through the edges of the retainer 30, vials 24 can be inserted in their respective passages after the retainer sections 32 and 34 have been assembled. This feature permits easy replacement of either vial should it become broken or damaged.

In order that the vials 24 register accurately when the indicator units A, B and C are assembled in the body D it obviously is necessary that there be some correlation between the position of retainers 30 during initial adjustment of the vials and the position of the retainer in the support. According to the present invention this correlation is accomplished by making the initial adjustment in a jig of the type shown in Fig. 7. The jig comprises a base 44 having an upstanding flange or wall portion 46 and the latter is provided with an opening 48 which is shaped to snugly receive a vial retainer 30. Formed integrally on the periphery of the retainer 30, and at a point where the radii of passages 40 intersect the periphery, is a radially projecting lug or guide 50. When the vial retainer 30 is mounted in the jig, the guide 50 is positioned in either of diametrically opposed recesses or guideways 52 which extend radially from the opening 48. These guideways are located on a precisely vertical diameter of the opening 48 and thus accurately position the retainer 30 with the radii absolutely vertical. Consequently, when the vials 24 are adjusted so that the bubbles 26 are disposed between indicator marks 28 they register a precisely horizontal position. In this connection it will be apparent that the vial 24 closest to the lug 50 is adjusted when the latter is disposed in the lower guideway 52 and that the vial 24 remote from guide 50 is adjusted with the latter disposed in the upper guideway 52. The upstanding flange 46 preferably is relatively thin to at least partially expose the ends of passages 40, or alternatively the vial retainer 30 is inserted only part way in opening 48 in such manner that the ends of passages 40 are at least partially exposed so that a suitable instrument can be inserted to move the vial longitudinally therein. When properly adjusted the vials are secured by a suitable cement or adhesive whereby to prevent them from shifting inadvertently and also to prevent unauthorized or inexperienced persons from disassembling the units and moving the vials out of adjustment.

The openings 12 also are provided with guideways 54 which snugly receive the projecting guide 50 of its respective indicator unit A, B or C and from left to right, the guideways 54 are disposed precisely at an angle of 45° with respect to, perpendicular to, and horizontal to the worktesting surfaces 14 and 16. Since these guideways 54 are precisely located and since they determine the position of the vial retainers 30 in the body D, the indicator units A, B and C accurately register angles of 45°, 0°, and 90° respectively. Moreover, any similar and similarly preadjusted indicator unit can be substituted for any of those in the body D and it will automatically be positioned to register accurately the angle of the opening 12 in which it is mounted. It will be readily apparent to those skilled in the art that the two vials 24 in each unit are used in conjunction with respective measuring surfaces 14 and 16.

Each of the vial retainers 30 project at both sides of the web 10, as shown in Fig. 3, and the guide 50 is cut back from the faces of the retainer to extend flush with the web and provide continuous projecting annular surfaces. Fitting snugly over the projecting portions of the retainers 30 and fastened to the web 10 by screws 56 are covers E of Plexiglas or other suitable transparent or translucent plastic material. It will be observed that each of these covers is formed in its inner face with a socket 58 which fits snugly over one projecting portion of a retainer 30 and defines a flange around the latter which seats solidly against the web 10. Thus, the covers E collectively seal indicator units A, B and C and prevent dust and moisture from gaining access thereto.

Preferably, covers E are transparent, colored differently and in contrasting colors so that the user can easily distinguish the three indicator units at a glance. For example, it is contemplated that the retainers from left to right in Fig. 1 be colored amber, green and red, respectively.

Attention is now directed to Figs. 8 and 9 which show the spirit level hereinabove described uniquely associated with a square in such manner that its utility is substantially enhanced. The arrangement is such that the square can be placed either with one side or any of its three edges against the surface to be tested and the spirit level is adjustable longitudinally on the square so that all of the free edges of the latter can be used regardless of the length of the level.

The square here shown by way of illustration is generally triangular in plan and preferably is formed from two identical pieces 60 and 62 of sheet metal, which pieces are placed side-by-side or back-to-back and spot welded or otherwise fastened together. Extending from one edge of the square are cutout portions 64 and 66 which define separate sections 68, 70 and 72.

According to the present invention the marginal portions of the end sections 68 and 72 have outturned flanges 74 and 76 which extend in opposite directions and in the same plane to provide a flat seat for one longitudinal edge of the spirit level. As best shown in Fig. 9, the outer portions of flanges 74 and 76 are bent upwardly and inwardly to extend over the base flanges of the body D and to define a guideway therefor. It will be observed that this guideway snugly fits the base flanges of the body D so as to prevent play between the spirit level and square, but the spirit level is adjustable longitudinally in the guideway.

The portions 78 and 80 of the middle section 70 are unattached and extend outwardly in divergent relation to define clamping arms, as best shown in Fig. 9. Adjacent their outer or distal edges arms 78 and 80 are disposed against and in embracing relation to the base flanges of the body D and the margins 82 and 84 thereof are inturned to overlie the base flanges of the body.

Connecting arms 78 and 80 adjacent their distal edges is a clamping screw 86 which carries a large-headed manually operated nut 88.

When the nut 88 is tightened, arms 78 and 80 are pulled tightly against the base flanges of the body D to hold the spirit level fixedly associated with and in a selected adjusted position on the square. Conversely, when nut 88 is loosened, clamping arms 78 and 80 release the base flanges so that the spirit level can be easily adjusted longitudinally on the square.

It will also be observed that the other two edges of each plate 60 and 62 have outwardly extending flanges 90 and 92, which flanges extend beyond the gripping arms 78 and 80 and are adapted to provide a flat supporting surface for the square and spirit level when they are placed edgewise on a surface being tested and with the plate 62 down. Since the flanges 90 and 92 on plate 62 extend beyond the clamping arm 80 there is no interference from the latter or from the head of clamping screw 86. Also, the flanges 90 and 92 of plate 60 can be used in the same manner merely by reversing the screw 86 and nut 88.

It is to be understood that the form of the invention herewith shown and described is to be taken as a preferred example of the same and that various changes in the size, shape and arrangement of parts may be resorted to without departing from the spirit of the invention or the scope of the appended claims.

Having thus described the invention, we claim:

1. In combination, a spirit level having a base portion, and a square attached at one edge thereof to said base portion and adjustable longitudinally therealong, said square formed from two plates fastened back-to-back and having cut-out portions extending from the attached edges thereof which define separate sections along said edge, means on at least one of said sections forming a seat in which said base portion slidably fits, the margins of said plates being separate and arranged in outwardly divergent relation along another of said sections and said divergent margins arranged in embracing relation to said base portion; and clamp means for drawing said divergent margins solidly against the base portion whereby to hold the spirit level in a selected adjusted position on the square.

2. In combination, a spirit level having a work-engaging surface, and a square having an edge supporting and fastened to the work-engaging surface of the level and adjustable longitudinally therealong, said square formed from two similarly shaped plates fastened back-to-back and having cut-out portions extending from said fastened edge which portions define separate sections along said edge, the margins of said plates along certain of said sections shaped to define seats for the work-engaging surface of the level and the margins of said plates along at least one of said sections being separate and outwardly divergent, said divergent margins embracing said work-engaging surface and defining inherently resilient clamping arms for holding the spirit level in a selected adjusted position on the square; and clamp means for drawing said clamping arms solidly against the spirit level.

3. In combination, a spirit level having a work-engaging surface and oppositely directed laterally extending flanges along said surface, and a square formed from two similarly shaped plates fastened back-to-back and having cut-out portions extending from one edge thereof which define separate sections along said edge, the margins of said plates along certain of said sections bent outwardly to define spaced seats for the work-engaging surface of the spirit level and said outwardly bent margins formed along the side edges of said seat with portions shaped to fit around said flanges and provide guideways therefor and the margins of the plates along at least one of said sections being outwardly divergent, arranged in embracing relation to said base flanges and defining inherently resilient clamping arms, the distal edges of said clamping arms having inturned lip portions which overlie said base flanges; and clamp means for drawing said clamping arms solidly against the spirit level.

4. In combination, a spirit level having a work-engaging surface, and a square having work-testing edges and an edge supporting and fastened to the work-engaging surface of the level and adjustable longitudinally therealong, said square formed from two similarly shaped plates fastened back-to-back and having oppositely extending flanges along said work-testing edges, the flanges on each side of the square being coterminous and planes through the edges of said flanges disposed beyond any part of the spirit level whereby to hold the latter above the work when the flanges are placed edgewise thereagainst, said plates further having cut-out portions extending from said fastened edge which portions define separate sections along said edge, the margins of said plates along certain of said sections shaped to define seats for the work-engaging surface of the level and the margins of said plate along at least one of said sections being separate and outwardly divergent, said divergent margins embracing said work-engaging surface and defining inherently resilient clamping arms for holding the spirit level in a selected adjusted position on the square; and clamp means for drawing said clamping arms solidly against the spirit level.

JOHN SCHULTES.
VINCENT SCHULTES.

REFERENCES CITED

The following references are of record in the file of this patent:

UNITED STATES PATENTS

| Number | Name | Date |
|---|---|---|
| 304,601 | Boettcher | Sept. 2, 1884 |
| 997,551 | Hall | July 11, 1911 |
| 1,011,262 | Starrett | Dec. 12, 1911 |
| 1,298,010 | Coleman | Mar. 25, 1919 |
| 1,376,559 | McKeown | May 3, 1921 |